(12) United States Patent
Ezell et al.

(10) Patent No.: US 10,348,778 B2
(45) Date of Patent: Jul. 9, 2019

(54) DYNAMIC DEVICE PAIRING WITH MEDIA SERVER AUDIO SUBSTITUTION

(71) Applicant: Avaya Inc., Basking Ridge, NJ (US)

(72) Inventors: Joel M. Ezell, Broomfield, CO (US); Ming Hou, Belleville (CA); Zlatan Dedic, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 768 days.

(21) Appl. No.: 13/763,438

(22) Filed: Feb. 8, 2013

(65) Prior Publication Data

US 2014/0229624 A1   Aug. 14, 2014

(51) Int. Cl.
*H04L 29/06* (2006.01)

(52) U.S. Cl.
CPC ...... *H04L 65/1069* (2013.01); *H04L 65/1096* (2013.01); *H04L 65/403* (2013.01); *H04L 65/605* (2013.01)

(58) Field of Classification Search
CPC .............. H04L 65/1069; H04L 65/403; H04L 65/1096; H04L 65/605
USPC ....................................................... 709/227
See application file for complete search history.

(56) References Cited

U.S. PATENT DOCUMENTS

| | | | | |
|---|---|---|---|---|
| 4,710,917 A | * | 12/1987 | Tompkins | H04Q 11/04 348/14.08 |
| 4,847,829 A | * | 7/1989 | Tompkins | H04M 3/561 370/260 |
| 7,716,273 B2 | * | 5/2010 | Soin | H04W 4/20 709/203 |
| 8,276,195 B2 | | 9/2012 | Chou et al. | |
| 8,294,823 B2 | * | 10/2012 | Ciudad | H04N 7/147 348/14.08 |
| 9,794,514 B1 | * | 10/2017 | Yoakum | G06F 3/165 |
| 2003/0002448 A1 | * | 1/2003 | Laursen | H04L 12/1827 370/261 |
| 2003/0002481 A1 | * | 1/2003 | Laursen | H04L 29/06027 370/352 |
| 2003/0210326 A1 | * | 11/2003 | Runcie | H04N 7/144 348/14.16 |

(Continued)

FOREIGN PATENT DOCUMENTS

| CN | 101383876 A | * | 3/2009 | ............... H04M 3/56 |
|---|---|---|---|---|
| GB | 0916765 | * | 11/2009 | ......... H04L 12/1822 |

(Continued)

OTHER PUBLICATIONS

Non-published U.S. Appl. No. 13/595,626, (Avaya IDR 412057), Ezell, Method and Apparatus for Dynamic Device Pairing (on file, not submitted with this form).

(Continued)

*Primary Examiner* — Kostas J Katsikis
(74) *Attorney, Agent, or Firm* — Sheridan Ross P.C.

(57) ABSTRACT

A communication system, method, and components are described. Specifically, a communication system having the ability to enable a media server to provide audio substitution during a dynamic device pairing scenario is disclosed. The media server may be included in the call topology, for instance, by way of a dynamic device pairing server or application that facilitates the dynamic pairing of a media device and a control device for a communication session.

20 Claims, 5 Drawing Sheets

(56) References Cited

U.S. PATENT DOCUMENTS

| | | | | |
|---|---|---|---|---|
| 2004/0183756 | A1* | 9/2004 | Freitas | H04N 5/44543 345/73 |
| 2006/0080407 | A1* | 4/2006 | Rengaraju | H04L 65/4061 709/219 |
| 2006/0089994 | A1* | 4/2006 | Hayes | H04L 63/0807 709/227 |
| 2007/0041528 | A1* | 2/2007 | Menon | H04L 29/06 379/90.01 |
| 2007/0136778 | A1* | 6/2007 | Birger | G11B 19/025 725/117 |
| 2007/0220162 | A1* | 9/2007 | Levin | H04N 7/17336 709/231 |
| 2007/0244702 | A1* | 10/2007 | Kahn | G10L 15/22 704/260 |
| 2008/0109451 | A1* | 5/2008 | Harding | G06F 17/30864 |
| 2008/0168129 | A1* | 7/2008 | Robbin | H04L 65/60 709/203 |
| 2008/0250151 | A1* | 10/2008 | Tomita | G06F 21/10 709/229 |
| 2008/0256205 | A1* | 10/2008 | Mahoney | G06F 15/16 709/206 |
| 2008/0267170 | A1* | 10/2008 | Allen | H04M 3/42314 370/352 |
| 2009/0016531 | A1* | 1/2009 | Dorfman | H04L 63/0442 380/275 |
| 2009/0172400 | A1* | 7/2009 | Rave | G06F 3/0607 713/169 |
| 2010/0220635 | A1 | 9/2010 | Gisby et al. | |
| 2011/0038281 | A1* | 2/2011 | Saleem | H04L 12/1822 370/260 |
| 2011/0110364 | A1* | 5/2011 | Fried | G06Q 30/02 370/352 |
| 2011/0134804 | A1* | 6/2011 | Maes | H04M 7/0012 370/259 |
| 2011/0289203 | A1 | 11/2011 | Braudes et al. | |
| 2011/0304443 | A1* | 12/2011 | Sheridan | H04N 7/163 340/12.5 |
| 2012/0323579 | A1* | 12/2012 | Gibbon | G10L 15/1822 704/270 |
| 2013/0300547 | A1* | 11/2013 | Park | H04L 12/2809 340/12.22 |
| 2013/0335515 | A1* | 12/2013 | Wamorkar | H04M 3/567 348/14.09 |
| 2013/0339781 | A1* | 12/2013 | Wamorkar | G06F 11/20 714/4.2 |

FOREIGN PATENT DOCUMENTS

| | | | | |
|---|---|---|---|---|
| WO | WO-02060166 | A1 * | 8/2002 | H04L 12/1822 |
| WO | WO-2008157005 | A1 * | 12/2008 | H04M 3/569 |
| WO | WO-2009030128 | A1 * | 3/2009 | H04M 3/56 |

OTHER PUBLICATIONS

Non-published U.S. Appl. No. 13/794,271, (Avaya IDR 413018), Ezell, Dynamic Device Pairing With Control Session Establishment (on file, not submitted with this form).

* cited by examiner

DYNAMIC DEVICE PAIRING WITH MEDIA SERVER AUDIO SUBSTITUTION

FIELD OF THE DISCLOSURE

The present disclosure is generally directed toward communications and more specifically toward unified communications.

BACKGROUND

It is often advantageous to allow a user of a communication system to access different communication devices. For example, a user associated with a desk phone in the user's office may wish to access a phone in a different room. As a further example, users may have need of different communication capabilities for different communications, and those capabilities may be best supported by different communication devices. In such situations, it is often desirable to present the device used to support the communication (e.g., the media stream) to other communication devices and/or the communication system as the user's personal device. Similar situations arise when advanced call control is desired from a softclient running on a computing device.

Systems have been developed that allow a user to forward calls from a communication device associated with a communication address, to an alternate communication device. However, communications placed from the alternate device are typically not presented to called parties as being associated with the communication address of the user's primary device. In addition, communications conducted in connection with an alternate device using call forwarding are generally made without the application of call features or restrictions associated with the primary device.

Still other systems have been developed that pair an alternate device to a user's primary device. For example, systems have been developed to support telecommuters, to enable users to present a consistent communication address to called and calling parties. However, such systems suffer from deficiencies with respect to the application of calling features and restrictions. For example, where pairing is accomplished by a mechanism outside of a server responsible for applying other features and restrictions, that other server may be unaware of a pairing that has been implemented. As a result, the features and restrictions applied to a call involving paired devices may be those associated with a paired device, rather than a pairing device or both the pairing and paired devices. This can in turn result in a failure to apply restrictions that should be enforced with respect to the call and/or in desired features being unavailable.

SUMMARY

A Method and Apparatus for Dynamic Device Pairing has been developed and described in U.S. patent application Ser. No. 13/595,626, filed Aug. 27, 2012, the entire contents of which are hereby incorporated herein by reference. This Dynamic Device Pairing seeks to present the paired and pairing devices as one to the outside world. As a result, the provision of features can be maintained, even when a pairing operation has been performed. Additionally, it is desirable to implement this feature with minimal impact on the pairing endpoint. It should be able to signal as it normally does if it is a full participant in the call without knowing whether the pairing feature is applied by a feature server. It is also desirable that this feature addition allows pairing from somewhere other than the desk of the end user and as an on-demand option.

A benefit of the Dynamic Device Pairing described above is that a media server is not required for the feature. On the other hand, the non-use of a media server has the following drawbacks: (1) there could be problems with active speaker indications because no Realtime Transport Protocol (RTP) would be flowing to the controlling device; (2) there are no allowances for "split stream" flows with audio going to one device and video going to another device; (3) the controlling device thinks it is on far end hold and this may lead to issues with the device not offering certain control operations that it would otherwise offer; and (4) a "REFER-back" call flow is required to allow the paired device to hear ringback—this call flow is not ubiquitously supported.

Embodiments of the present disclosure propose the use of a media server in connection with a dynamic device pairing scenario. Specifically, embodiments of the present disclosure provide, among other things, that the media server can substitute audio from one device for that offered by the other device. In addition, the above-mentioned issues can be addressed.

It is with respect to the above issues and other problems that the embodiments presented herein were contemplated. In particular, embodiments of the present disclosure propose that the Session Description Protocol (SDP)-substitution Dynamic Device Pairing (DDP) model is implemented whereby the controlling endpoint can signal as it would for any other call, and a sequenced application implements the pairing relationship. In some embodiments, the sequenced application that implements the pairing relationship may be referred to as a "DDP application." Although the term "DDP application" will be used in connection with a sequenced application in a SIP-based communication network, it should be appreciated that any type of module, object, non-sequenced application, or the like may be utilized to implement the functionality described in connection with a DDP application. In other words, it is possible to enable a non-sequenced application, any other application, or any other computing instruction or set of instructions to provide the DDP features described herein.

In some embodiments, the DDP application is configured to be orig and/or term sequenced such that it is first on the origination sequencing side and last on the termination sequencing side. With this solution, however, instead of performing the SDP swapping flow and putting the control device on far-end hold, the DDP application will create a "hidden" conference using a media server. As a non-limiting example, the flow for outbound calls could be provided as follows:

- Control device sends an INVITE with SDP Offer (e.g., SDP Offer contains information for control device "F")
- DDP application is sequenced and establishes the conference on the media server
- DDP application sends SDP Offer ("F") to the media server
- Media server responds with SDP Answer (e.g., SDP Answer contains information to pair media server and control device "MF")
- DDP application solicits SDP Offer (e.g., SDP Offer that contains information to pair media server and media/paired device "MP") from the media server for the paired device (e.g., media device)
- DDP application sends INVITE to media device with SDP Offer ("MP")

When user answers on the media device, 200 OK is sent to DDP application with SDP Answer (e.g., SDP Answer contains SDP information for media/paired device "P")

DDP application relays SDP Answer ("P") back to the media server to establish an RTP stream between the media server and media device DDP application instructs the media server to play ringback or other early media back to the media device DDP application solicits SDP Offer (e.g., SDP Offer that contains information to pair media server and called device "MC") from the media server DDP application sends INVITE to the called device with SDP Offer ("MC")

Called user answers and 200 OK is sent back with SDP Answer (e.g., SDP Answer contains SDP information for called device "C")

SDP Answer ("C") is relayed to media server to establish RTP stream between media server and called device 200 OK is sent back to control device with SDP Answer ("MF"): It should be noted that this SDP Answer could have been sent in a 18x early media response.

A flow as described above may result in 3 audio streams to the hidden conference, one from each device (e.g., media device, control device, and called/calling device) to the media server. An incoming call flow would be quite similar and would result in the same call topology.

After the media streams/dialogs are established, the DDP application can configure the media server to change media flows to/from the various devices to suit its purposes. In some embodiments, a media flow may include a bi-directional flow established between the media device and called device with silence flowing to control device. It could be useful to actually send silence/comfort noise packets to control device rather than using silence suppression so that the control device can get active speaker notification (CSRC) in the packets.

Another possible media flow may be utilized if the media device is not video capable, but the control device is video capable. In such a case, the media server could be configured to send audio to the media device (e.g. a conference room phone) and video to the control device. As such, a multimedia communication session can be facilitated at both dynamically-paired devices.

As can be appreciated, embodiments of the present disclosure address the shortcomings of the SDP substitution solution in that active speaker indication works since RTP is flowing to the control device, split audio/video streams are enabled, ringback can be provided even if the media device is not REFER-capable, and the control device sees itself as a full participant in the communication session so all control operations can be enabled.

In accordance with at least some embodiments of the present disclosure, a method of facilitating a communication session between a first user and a second user is provided, the method comprising:

establishing a first media path between a media server and a control device operated by the first user;

establishing a second media path between the media server and a media device operated by the first user, at least some functions of the media device being controllable by the control device;

establishing a third media path between the media server and a third communication device operated by the second user; and obscuring an existence of the first media path from the second user during the communication session.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
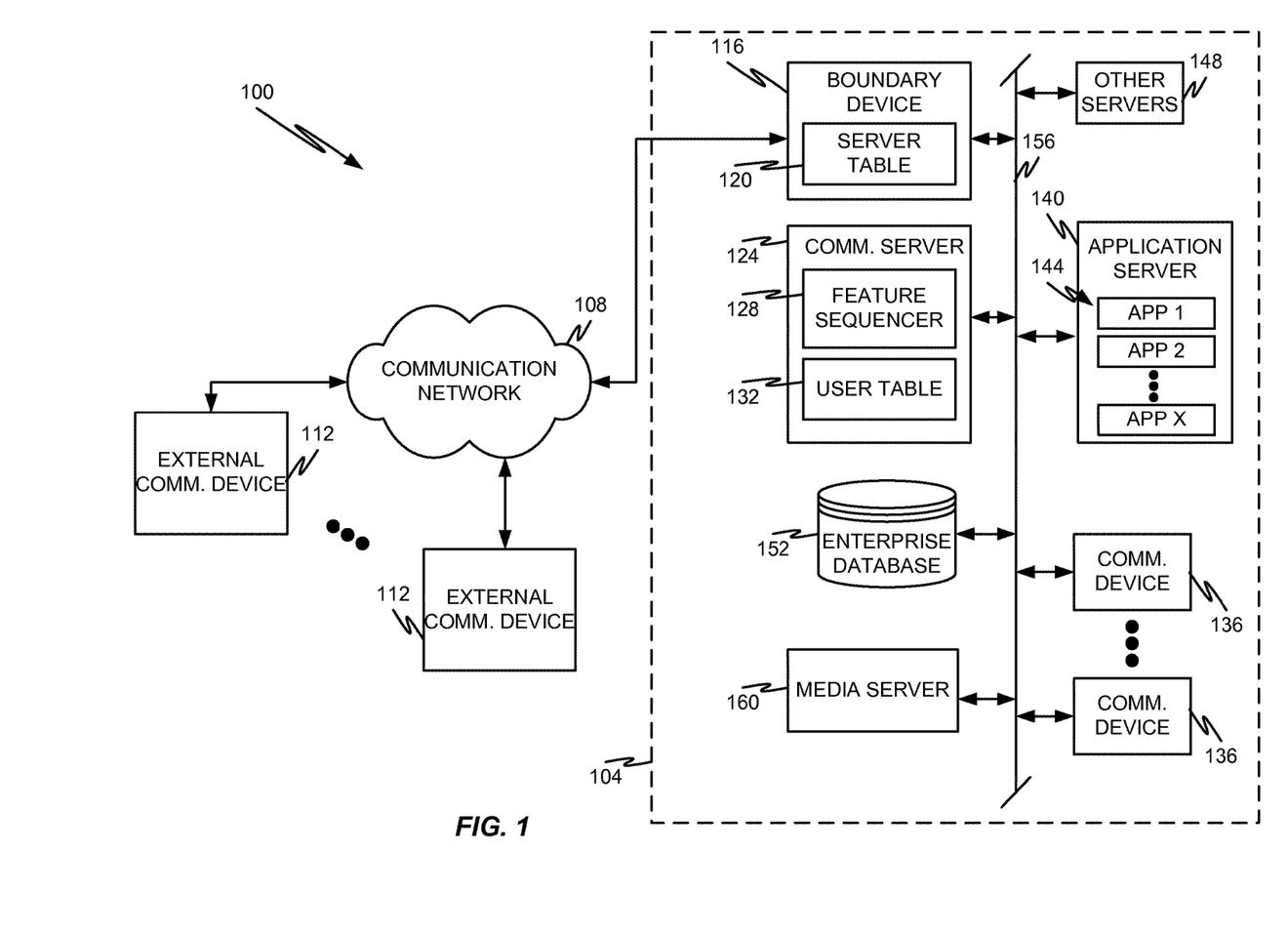
FIG. 1 is a block diagram of a communication system in accordance with embodiments of the present disclosure.

With reference initially to FIG. 1, a communication system 100 will be described in accordance with embodiments of the present disclosure. The communication system 100 is depicted as including an enterprise network 104 that is connected to one or more external communication devices 112 via a communication network 108. Components of the enterprise network 104 are depicted as including a network boundary device 116, a communication server 124, a plurality of communication devices 136, one or more application servers 140 having one or more applications 144, one or more media servers 160, other servers 148, and an enterprise database 152. It should be appreciated that one or more of the components depicted as being within the enterprise network 104 may alternatively or additionally be provided outside the enterprise network 104.

In some embodiments, the communication network 108 may correspond to any type of known communication network. Examples of a suitable communication network 108 include, without limitation, the Internet, the Public Switched Telephone Network (PSTN), a cellular network, an IMS network, an ISDN network, any other packet-switched network, any other circuit-switched network, or combinations thereof. In one configuration, the communication network 108 is a public network supporting the TCP/IP suite of protocols.

The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, tablets, Personal Computers (PCs), Personal Digital Assistants (PDAs), digital phones, analog phones, and the like.

The communication devices 136 within the enterprise network 104, similar to the external communication devices 112, may correspond to user communication devices and, in some embodiments, may correspond to a UA or multiple UAs of enterprise users. Examples of communication devices 136 include, without limitation, a telephone, a softphone, a cellular phone, a multi-speaker communication device (e.g., conference phone), a video phone, a PC, a laptop, a tablet, a PDA, a smartphone, a thin client, or the like. It should be appreciated that a communication device 136 may be configured to support single or multi-user interactions with other communication devices 136 within the enterprise network 104 as well as other communication devices 112 that are external to the enterprise network 104.

The communication devices 112, 136 may include any collection of components (hardware and software) that enable users to exchange media (e.g., voice, video, etc.), data (e.g., emails, Short Message Service (SMS) messages, Multimedia Message Service (MMS) messages, files, presentations, documents, etc.) with one another's communication devices over the communication network 108 and/or within the enterprise network 104.

The enterprise network 104 may correspond to either a single-location enterprise network or a multi-location enterprise network. A single-location enterprise network may comprise a network backbone 156 that corresponds to a Local Area Network (LAN) that includes wired (e.g., Ethernet) and/or wireless (e.g., Wi-Fi) technologies. A multi-location enterprise network may comprise a network backbone 156 that is a Wide Area Network (WAN), which connects a plurality of LANs or similar network locations via one or more untrusted networks, such as the communication network 108.

In some embodiments, the network boundary device 116 is provided to separate the external communication devices 112 and the untrusted communication network 108 from the network backbone 156 and components contained within the enterprise network 104. As an example, the network boundary device 116 operates to secure the enterprise network 104 from malicious attacks from the communication network 108. Examples of a network boundary device 116 include, without limitation, a Session Border Controller (SBC), a gateway, a Network Address Translation (NAT) device, a firewall, a router, or any other collection of hardware and/or software that performs one or more functions such as filtering, protocol translation/mapping, impedance matching, rate conversion, fault isolation, signal translation, encryption, packet tunneling, etc. as necessary to provide interoperability and/or security for the enterprise network 104.

As shown in FIG. 1, the boundary device 116 includes a server table 120. The server table 120 may correspond to any data structure or collection of data structures that enables the boundary device 116 to appropriately route messages from the external communication devices 112 to one or more communication servers 124 of the enterprise network 104. Specifically, while the enterprise network 104 is only depicted as having a single communication server 124, it should be appreciated that some enterprise networks 104 may comprise a plurality of communication servers 124 and each of those servers may be authoritative for (e.g., provide services for) a subset of enterprise users. In such a scenario, messages received at the boundary device 116 will be routed to the appropriate communication server 124 by referring to entries in the server table 120 that may define which communication server 124 is authoritative for an enterprise user that is a target of the received message.

In some embodiments, the communication server 124 may be used to help establish communication sessions and/or move signaling paths, change call topology, etc. Specifically, the communication server 124 may include a Private Branch eXchange (PBX), an enterprise switch, an enterprise server, combinations thereof, or any other type of telecommunications system switch or server. The communications server 124 is, in some embodiments, configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

As noted above, although only a single communications server 124 is depicted in FIG. 1, two or more communications servers 124 may be provided in a single enterprise network 104 or across multiple separate LANs 156 owned and operated by a single enterprise, but separated by the untrusted communication network 108. In configurations where an enterprise or an enterprise network 104 includes two or more communications servers 124, each server 112 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user.

Additionally, multiple servers 124 can support a common user community. For example, in geo-redundant and other applications where users aren't necessarily bound to a single application server, there may be a cluster of equivalent servers where a user can be serviced by any server in the cluster.

A communications server 124 can be configured to include user communication preferences in a user table 132, which map, for a corresponding (enterprise subscriber) user, to a set of communication preferences to be invoked for an incoming and/or outgoing contact for each user for whom it is authoritative. Even more specifically, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by an untrusted communication network 108. When an external communication device 112 is involved in at least one of a call and/or transfer, then yet another communication server 124 may invoked to sequence applications, as needed.

In accordance with at least some embodiments of the present disclosure, the communication sever 124 may include a feature sequencer 128 that is configured to instantiate the communication preferences for a calling and/or called user, regardless of whether or not the calling and/or called user are using an external communication device 112 or internal communication device 136. In some embodiments, the user communication preferences in the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session. As can be appreciated, the application sequence can be set-up for new communication sessions or communication sessions in which two or more devices (e.g., communication devices 136) are dynamically paired together.

In accordance with at least some embodiments, the communication server 124 can determine an application sequence and cause one or more applications 144 to be sequenced into a communication session. In particular, the communication server 124 is configured to analyze a particular user's communication preferences as defined in the user table 132 and invoke the necessary applications 144 to fulfill such preferences. Once an application sequence is determined for a calling and/or called user, the communications server 124 passes the communication-establishing message (e.g., an INVITE message) to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the communication server 124 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only a single application server 140 is depicted, one skilled in the art will appreciate that one, two, three, or more applications servers 140 can be provided and each server may be configured to provide a single application or a set of applications 144. The applications provided by a particular application server 140 may vary depending upon the capabilities of the server 140 and in the event that a particular application server 140 comprises a set of applications 144, one, some, or all of the applications in that set of applications 144 may be included in a particular application sequence. There is no requirement, however, that all applications in a set of applications 144 be included in an application sequence and there is no requirement as to the order in which applications are included in the application sequence. Rather, the application sequence is usually determined based on a user's communication preferences, which can be found in the user communication preferences table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences related to invoking and enabling communication sessions where the user utilizes two or more devices that have been dynamically paired to one another (e.g., where one device is used to receive a first media type, such as voice, and another device is used to receive a second media type and/or control information). For instance, a user may define within the user table 132 that a Dynamic Device Pairing (DDP) application may be invoked for any outbound calls initiated by the user with a certain communication device 136 (or external communication device 112 as appropriate). Similarly, a user may define that a DDP application may be invoked within an application server 140 for certain types of inbound calls directed toward the user.

The applications included in a particular application sequence are generally included to accommodate the user's preferences. Applications may vary according to media-type, function, and the like. One specific type of application that will be discussed in further detail herein is a DDP application. Other suitable types of applications include, without limitation, an EC-500 (extension to cellular) application, a call-setup application, a call-recording application, a voicemail application, an email application, a voice application, a video application, a text application, a conferencing application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

In some embodiments, when the communication server 124 includes one or more applications 144 in a communication session, those applications may be configured to behave as a B2BUA. When an application, or any other communication element, behaves as a B2BUA, the application inserts itself in the control signaling path so that it can maintain complete call state and participate in all call requests.

One or more applications 144 within the application server 140 may be configured to invoke or employ the media server 160 to help execute the functionality defined for that function. For instance, a media server 160 may be employed for an IVR application. As another example, a DDP application may invoke the media server 160 to help provide early media or ringback to a calling party when the DDP application has dynamically paired two different devices together for a certain user or group of users. Additional details of this functionality will be described in further detail herein.

Although the media server 160 is depicted as being separate from the application server 140 and/or the applications 144 within the application server 140, it should be appreciated that a single server may comprise the functionality of both the application server 140 and media server 160. As another possibility, a particular application 144 may natively comprise the capabilities of the media server 160. In other words, it should be appreciated that embodiments of the present disclosure should not be construed as being limited to environments having an application server 140 separate from a media server 160.

The other servers 148 may include any other type of server or switch needed for operating the enterprise network 104. Examples of suitable other servers 148 include, without limitation, presence servers, Instant Messaging (IM) servers, email servers, voicemail servers, virtual machines, web servers, call center servers, Interactive Voice Response (IVR) units, etc.

The enterprise database 152 may include information regarding enterprise users and/or non-enterprise users. Specifically, the enterprise database 152 may comprise information that identifies enterprise users, their relative position within the enterprise hierarchy, network permissions, communication permissions, Customer Relationship Management (CRM) information, etc. The enterprise database 152 may be any type of data storage system and may include one or more hierarchical databases, relational databases, or any other type of known database structure such as a SQL database. The enterprise database 152, although depicted as being separate from the user communication preferences table 132 in the communication server 124, may comprise the data regarding user communication preferences 132 and may be accessible to the communication server 124 via a database lookup or query/response protocol.

It should be appreciated that some or all of the functions depicted in FIG. 1 may be co-hosted and/or co-resident on a single server. The depiction of components in FIG. 1 is generally intended to be a logical depiction of the components of the system 100.

Figure 2A:
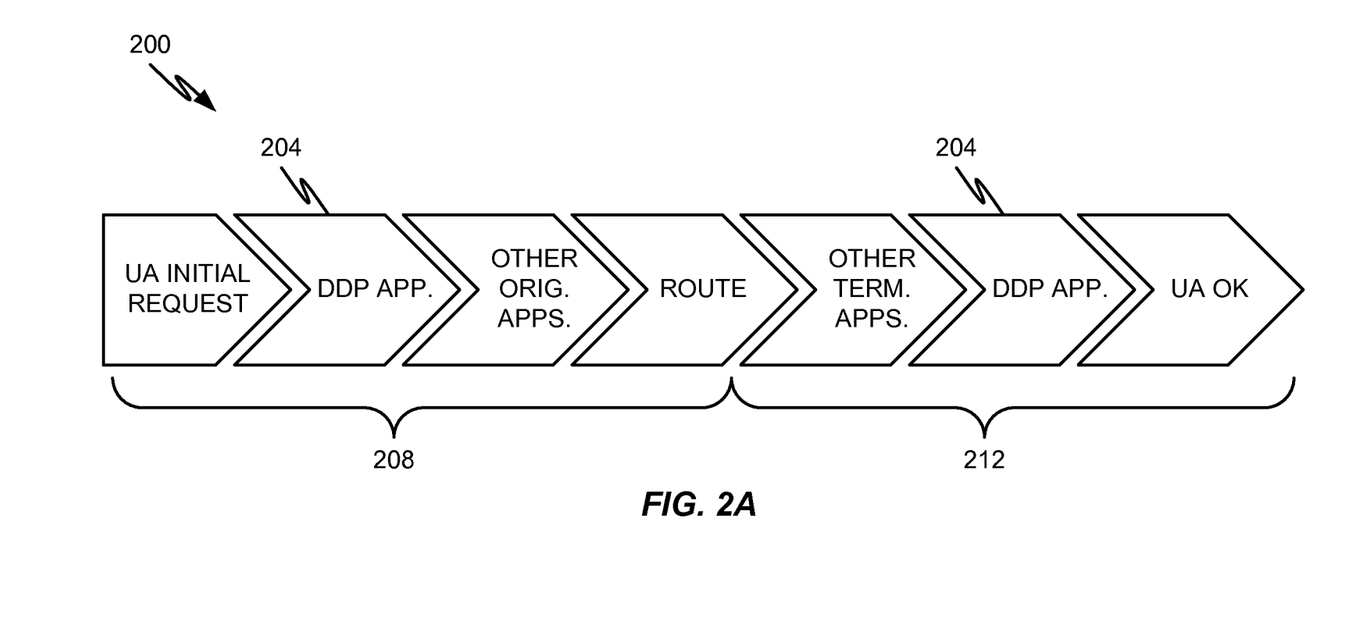
FIG. 2A is a diagram depicting an application sequence used in accordance with embodiments of the present disclosure.

With reference now to FIG. 2A, additional details of an application sequence or call vector will be described in accordance with embodiments of the present disclosure. FIG. 2A depicts a call vector 200 for an outbound (e.g., call originated within an enterprise network 104) or inbound (e.g., call originated outside of an enterprise network 104) call. Specifically, the call vector 200 comprises an origination sequencing side (e.g., orig-sequence) 208 and a termination sequencing side (e.g., term-sequence) 212. The orig-sequence 208 may generally correspond to the application sequence that is created in accordance with a calling party's communication preferences as defined within user table 132. The term-sequence 212 may generally correspond to the application sequence that is created in accordance with a called party's communication preferences as defined within user table 132. In embodiments where the called or calling party corresponds to a user outside of the enterprise network or an unknown user, then one or more default application sequences may be invoked as appropriate.

In the depicted example, a DDP application 204 has been invoked for both the calling party and the called party. With reference first to the calling party, the DDP application 204 is invoked after the initial UA request is received at the communication server 124 and prior to any other applications are sequenced on the orig-sequence side 208 of the call vector 200. The DDP application 204 is sequenced prior to the other origination applications so that the DDP application is closest to the calling party's UA than any other applications, thereby ensuring that the features and functions provided by the DDP application operate successfully and are not interrupted by another application. As an example, if a recording application were provided between the UA and the DDP application 204, then the recording application would not get the audio from the paired device. Thus, the position of the DDP application 204 contributes, not only, to the proper functioning of the DDP application 204, but the position of the DDP application ensures that other applications work as anticipated despite the fact that the DDP application 204 is performing a dynamic device pairing function as described herein.

Similar to the orig-sequence, the called party has the DDP application 204 sequenced as close as possible to the UA of the called party. Specifically, the DDP application 204 is the last application sequenced on the term-side processing so that the DDP application 204 is closer to the called party's UA than any of the other term-side applications. Having the DDP application 204 be sequenced as the last term-side application enables the DDP application 204 to ensure that its features and functions are successfully deployed.

In some embodiments, the DDP application 204 for the called party and/or calling party may be inserted into the call vector 200 via an anchor point server, such as is described in U.S. Patent Publication No. 2011/0289203 to Braudes et al., the entire contents of which are hereby incorporated herein by reference. Thus, it may not be necessary to explicitly sequence the DDP application 204 into the call vector 200 during call setup. Rather, an anchor point server may initially be sequenced into the call vector 200 at the appropriate location and then the DDP application may connect to the call at a later time via the anchor point server.

Figure 2B:
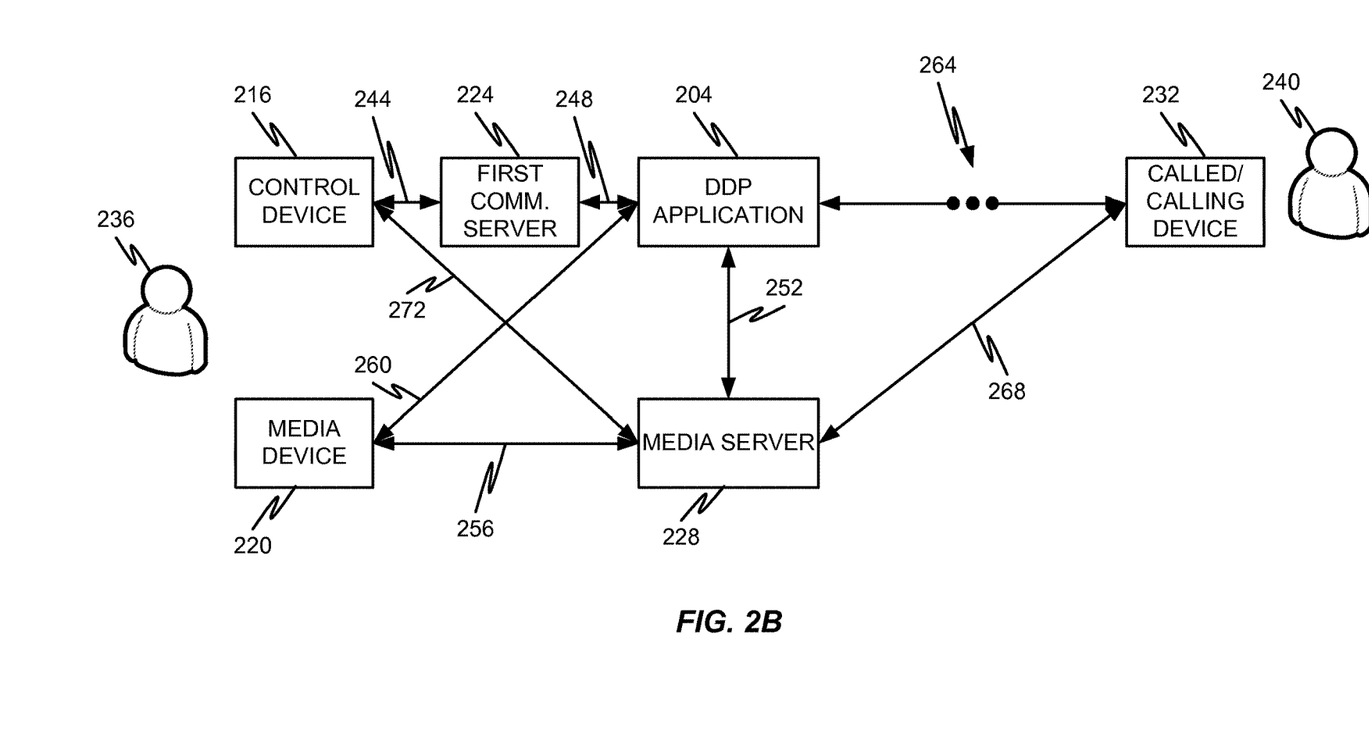
FIG. 2B is a diagram depicting a call topology created in accordance with embodiments of the present disclosure.
Figure 3:
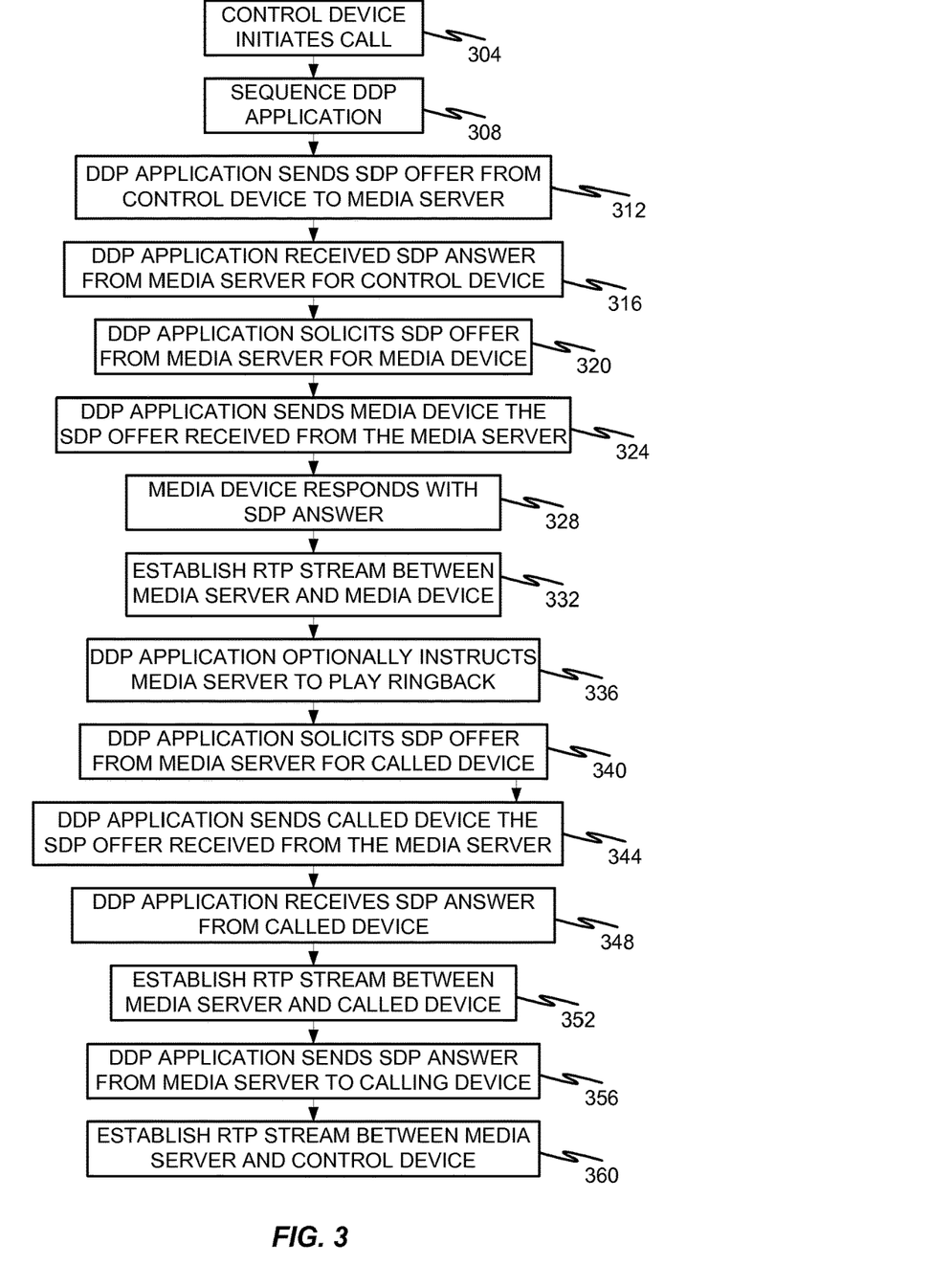
FIG. 3 is a flow chart depicting a first communication method in accordance with embodiments of the present disclosure.

With simultaneous reference now to FIG. 2B and FIG. 3, a first communication method will be described in accordance with at least some embodiments of the present disclosure. Specifically, the first communication method generally corresponds to a method of facilitating an outbound call for a calling user 236 for whom a DDP application 204 has been invoked. As can be seen in FIG. 2B, the calling user 236 may engage in a communication session using both a control communication device 216 and a media communication device 220. One or both devices 216, 220 may correspond to any type of communication device 112, 136 described herein above. Likewise, a called user 240 may be operating a called device 232, which may be similar or identical to any of the communication devices 112, 136 described herein. In other words, the called device 232 can either be an external communication device 112 or an internal communication device 136.

The method begins when the calling user 236 initiates a call at the control device 216 (step 304). When this occurs, the control device 216 generates and transmits an INVITE message along with an SDP Offer toward a first communication server 224. In some embodiments, the first communication server 224 may correspond to the communication server 124 that is authoritative for the calling user 236. Furthermore, the initial INVITE message may be transmitted via path 244, and the SDP Offer contained within the INVITE message may provide information that will enable other devices to communicate back to the control device 216.

Upon receiving the INVITE message, the first communication server 224 may refer to user communication preferences for the calling user 236 as defined within the user table 132. Upon referring to the communication preferences, the first communication server 224 may invoke the DDP application 204 for the calling user 236 (step 308). As discussed in connection with FIG. 2A, the DDP application 204 may correspond to the first application that is sequenced for the calling user 236 by the first communication server 224 although additional applications 144 may be sequenced thereafter. The first communication server 224 may invoke the DDP application 204 by sending the INVITE message received from the control device 216 to the DDP application 204 via path 248. The INVITE message sent to the DDP application 204 may contain the SDP Offer information initially sent by the control device 216.

When the DDP application 204 receives the INVITE message from the first communication server 224, the DDP application 204 may send the SDP Offer information received from the control device 216 to the media server 228 (step 312). The transmission of the SDP Offer information to the media server 228 may correspond to a step where the DDP application 204 invokes the media server 288. In embodiments where the DDP application 204 is operated on a separate server than the media server 228, the SDP Offer information may be transmitted with a SIP message (such as an INVITE message) via path 252. If both the DDP application 204 and media server 228 are operated on a common server, then the SDP Offer information may be transmitted via some mechanism other than an INVITE message.

The media server 228, in response to receiving the SDP Offer information (of the control device 216) from the DDP application 204, may respond to the DDP application 204 by transmitting an SDP Answer back to the DDP application 204 (step 316). This SDP Answer received from the media server 228 may contain SDP information that describes how the control device can communicate with the media server 228.

When the DDP application 204 receives the SDP Answer back from the media server 228, the DDP application 204 may solicit a separate SDP Offer from the media server 228 (step 320). The solicited SDP Offer may correspond to an offer that will eventually be used to establish a communication path between the media device 220 and the media server 228. In other words, the DDP application 204 may solicit a separate SDP Offer from the media server 228 for the media device 220. When the DDP application 204 receives the separate SDP Offer from the media server 228, the DDP application 204 may forward the separate SDP Offer, which may be contained in a separate INVITE message, to the media device 220 via path 260 (step 324). The media device 220, in response to receiving the SDP Offer, may respond with an SDP Answer (step 328). The SDP Answer may be transmitted back to the DDP application 204, which eventually forwards the SDP Answer back to the media server 228, perhaps in a SIP message (e.g., a 200 OK message).

The SDP Answer transmitted from the media device 220 to the media server 228 may enable the media server 228 to establish a media path with the media device 220 (step 332). In some embodiments, the exchange of SDP information between the media server 228 and media device 220 may enable the creation of an RTP or secure RTP (SRTP) stream between the media device 220 and media server 228. The RTP stream may be established over path 256 or it may traverse paths 260, 248, and 252.

Once the RTP stream is established between the media device 220 and media server 228, the DDP application 204 may optionally instruct the media server 228 to provide early media and/or ringback to the media device 220 (step 336). This early media and/or ringback may be provided over the now-established RTP stream.

Thereafter, simultaneous therewith, or prior to the establishment of the RTP stream between the media device 220 and media server, the method continues with the DDP application 204 soliciting yet another SDP Offer from the media server 228, this time for the called device 232 (step 340). The solicitation of this additional SDP Offer may be similar or identical to the SDP Offer solicited for the media device 220 and the response by the media server 228 may be the same (e.g., a transmission of another SIP message containing SDP information for the media server 228). The DDP application 204, upon receiving the additional SDP Offer from the media server 228, may then transmit the additional SDP Offer received from the media server 228 to the called device 232 (step 344). This additional SDP Offer may be transmitted within an INVITE message or a similar type of SIP message via path 264. As depicted by ellipses, the path between the DDP application 204 and called device 232 may traverse one or multiple other devices (e.g., other applications, B2BUAs, routers, communication servers 124, boundary devices 116, etc.). It should be noted that due to the intelligent positioning of the DDP application 204, the other devices and applications are completely unaware of the conference that has been set up by the DDP application 204. As far as the other devices and applications are concerned, the SDP offer from the media server came directly from the control device 216.

The called device 232 may respond to the DDP application 204 by generating and transmitting a response SIP message (e.g., a 200 OK message) that contains the SDP Answer from the called device 232 (step 348). In some embodiments, the SDP Answer is received at the DDP application 204 and forwarded to the media server 228 so that the media server 228 can establish an RTP or SRTP stream with the called device 232 (step 352). The media stream established between the media server 228 and the called device 232 may traverse path 268 or paths 264 and 252.

The DDP application 204, after receiving the SDP Answer from the called device 232 (thereby indicating that the called user 240 has answered the call), may transmit the SDP Answer received from the media server 228 back to the control device 216 (step 356). Specifically, in step 316, the SDP Answer received from the media server 228 may be held by the DDP application 204 until the SDP Answer is received from the called device 232. Once the SDP Answer is received from the called device 232, thereby signifying that the call has been answered, the DDP application 204 may then transmit the SDP Answer from the media server 228 back to the control device 216 (e.g., in a 200 OK message) to enable the creation of another media stream between control device 216 and media server 228. This particular media stream may or may not be utilized during the communication session. For example, the SDP Answer may contain information that will enable a separate media path 272 to be established between the media server 228 and the control device 216 or the SDP Answer may describe for the control device 216 the paths 244, 248, 252 that can be used for communication (step 360). In some embodiments, the media does not necessarily flow through paths 244, 248, 252; rather, those paths are used for signaling.

At this point, three separate media paths may be established at the media server 228, one between the media server 228 and control device 216, one between the media server 228 and media device 220, and one between the media server 228 and called device 232. In some embodiments, the existence of the three media paths as a conference at the media server 228 may be hidden from the user 240 and the call may be depicted as a point-to-point call between the called device 232 and one of the control device 216 and media device 220. Once all of the media streams have been established, the DDP application 204 may configure the media server 228 to change media flows to/from the various devices 216, 220, 232 to suit communication preferences of the calling user 236. For instance, the DDP application 204 may instruct the media server 228 to enable a bi-directional flow of media between the media device 220 and the called device 232 while providing silence or comfort noise packets to the control device 216. As another example, the DDP application 204 may instruct the media server 228 to send a first media type (e.g., voice) to the media device 220 while sending a second media type (e.g., video) to the control device 216. Such a scenario may be particularly useful if the media device 220 is not equipped to support video.

Figure 4:
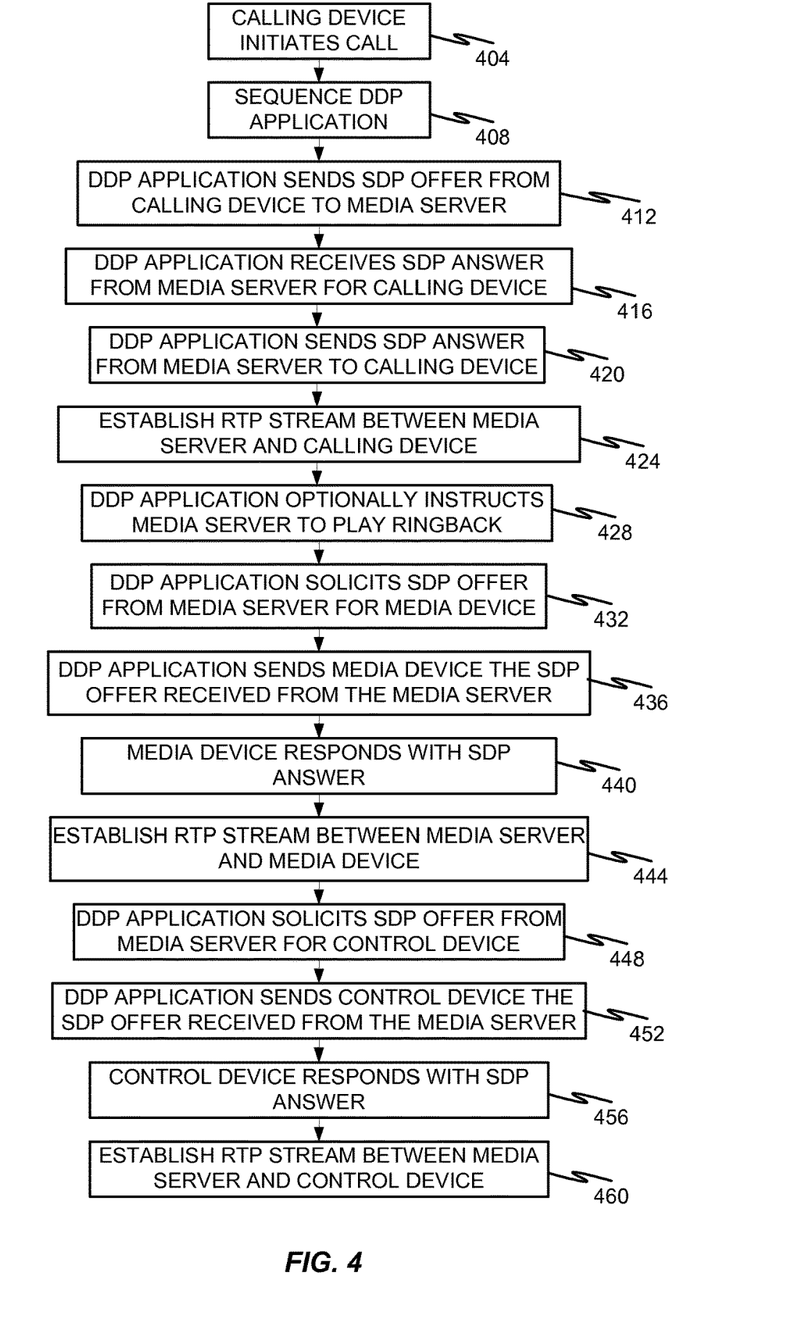
FIG. 4 is a flow chart depicting a second communication method in accordance with embodiments of the present disclosure.

With reference now to FIGS. 2B and 4, a second communication method will be described in accordance with embodiments of the present disclosure. Specifically, the second communication method generally corresponds to a method of facilitating an inbound call for a called user 236 for whom a DDP application 204 is invoked for a call received from a calling user 240. The call flow for an inbound call may be similar to the call flow for the outbound call described in connection with FIG. 3.

The method begins when the calling user 240 initiates a call with a calling device 232 (step 404). The call may be initiated with the transmission of an INVITE message from the calling device 232. Since the called user 236 has defined his/her desired use of the DDP application 204, the DDP application 204 is sequenced as the last application in the application sequence for the called user 236 (e.g., as a last sequenced application on the term-side processing) (step 408).

The DDP application 204, once invoked due to its receipt of an INVITE message from the calling device 232, may in turn, invoke the media server 228 to help facilitate the dynamic device pairing of the control device 216 and media device 220. The media server 228 may be invoked by having the DDP application 204 send the media device 220 the SDP Offer received from the calling device 232 (step 412). The media server 228 may respond to the DDP application 204 by transmitting an SDP Answer back to the DDP application 204 (step 416). This SDP Answer may correspond to an answer for the calling device 232 and, therefore, may be immediately transmitted back to the calling device 232 (step 420).

In some embodiments, if the media server 228 answer is sent back at this point, it could be sent in a 183 session progress message (e.g., early media) rather than a 200 OK because the call has not yet been answered by the called party. The DDP application 204 would then be obligated to use the media server 228 to play ringback tone. Alternatively, the DDP application 204 could not send anything back at this point and, instead, wait to see what it gets from the control/media devices. If the DDP application 204 gets a 180 message (e.g., no early media) then the DDP application 204 could just send the 180 message back to the caller. If the DDP application 204 gets a 183 session progress message with early media, then it could set up an early media stream back to the caller and ask the media server 228 to relay any early media packets received from the control/media devices.

The exchange of SDP information via the SDP Offer and SDP Answer may enable the media server 228 and calling device 232 to establish an RTP or SRTP stream therebetween (step 424). As an optional step, the DDP application 204 may instruct the media server 228 to provide early media and/or ringback to the calling device 232 while additional call setup occurs and/or while waiting for the called user 236 to answer the call (step 428).

Thereafter or simultaneous therewith, the DDP application 204 may solicit a first additional SDP Offer from the media server 228 for the media device 220 (step 432). Upon receiving the solicited SDP Offer, the DDP application 204 may transmit the first solicited SDP Offer to the media device 220 (step 436). The media device 220 may respond to the SDP Offer with an SDP Answer containing SDP information for the media device 220 (step 440). The DDP application 204 may forward the SDP Answer to the media server 228, thereby enabling the media server 228 and media device 220 to establish an RTP or SRTP stream with one another (step 444).

The DDP application 204 may then solicit a second SDP Offer from the media server 228, this time for the control device 216 (step 448). The DDP application 204, in response to receiving the second solicited SDP Offer, may transmit the second solicited SDP Offer to the control device 216 (step 452). Of course, the order in which solicited SDP Offers are transmitted to the paired devices (e.g., control device 216 and media device 220) can be reversed or performed in parallel without departing from the scope of the present disclosure. The control device 216 may respond with its own SDP Answer (step 456), which is eventually forwarded from the DDP application 204 to the media server 228, thereby enabling the media server 228 to establish an RTP or SRTP stream with the control device 216 (step 460).

At this point, similar to the flow depicted and described for the outbound call, the media server 228 may have three different media paths established to facilitate a communication session between the calling user 240 and the called user 236. The media server 228 may optionally enable/disable such media streams in response to various control commands received from the DDP application 204.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of facilitating a communication session between a first user and a second user, the method comprising:
    establishing a first bi-directional media path between a media server and a control device participating in the communication session, the control device comprising a first communication device exchanging audio and video in a media flow of the communication session and operated by the first user;
    pairing, by a sequenced application executing on an application server, the control device with a media device operated by the first user and participating in the communication session, the media device comprising a second communication device and wherein at least some functions of the communication session are controlled by the control device;
    establishing a second bi-directional media path between the media server and the media device;
    establishing a third bi-directional media path between the media server and a third communication device participating in the communication session, the third communication device exchanging audio and video in the media flow of the communication session and operated by the second user;
    changing, by the media server, media flow over the first bi-directional media path and the second bi-directional media path to send at least one of audio or video of the media flow of the communication session to the media device over the second bi-directional media path; and
    obscuring an existence of the media server and an existence of the media device from the second user during the communication session including during the exchanging of audio and video.

2. The method of claim 1, further comprising:
    enabling the first user and second user to exchange audio and video with one another via the second bi-directional media path and the third bi-directional media path; and
    enabling the first user to control the communication session with the control device, wherein control information is exchanged with the media server by the control device over the first bi-directional media path.

3. The method of claim 2, wherein the second bi-directional media path carries a first media type but not a second media type used during the communication session, the method further comprising:
    providing the second media type to the control device via the first bi-directional media path.

4. The method of claim 3, wherein the first media type is audio and the second media type is video.

5. The method of claim 1, further comprising:
providing at least one of early media, ringback, and comfort noise from the media server to the control device via the first bi-directional media path.

6. The method of claim 1, further comprising:
providing, during the communication session, one or more packets from the media server to the control device, the one or more packets including active speaker notification information.

7. The method of claim 1, wherein the communication session comprises a three-way conference between the control device, media device, and third communication device and wherein the existence of the second bi-directional media path is also obscured from the second user, thereby creating a perception to the second user that the first user is engaged in the communication session with only the control device.

8. The method of claim 1, wherein the first user corresponds to a called user and the second user corresponds to a calling user.

9. The method of claim 1, wherein the first user corresponds to a calling user and the second user corresponds to a called user.

10. A non-transitory computer-readable medium comprising processor-executable instructions that are executable by a processor to facilitate a communication session between a first user and a second user, the instructions comprising:
instructions that establish a first bi-directional media path between a media server and a control device participating in the communication session, the control device comprising a first communication device exchanging audio and video in a media flow of the communication session and operated by the first user;
instructions that pair the control device with a media device operated by the first user and participating in the communication session, the media device comprising a second communication device and wherein at least some functions of the communication session are controlled by the control device;
instructions that establish a bi-directional second media path between the media server and the media device;
instructions that establish a third bi-directional media path between the media server and a third communication device participating in the communication session, the third communication device exchanging audio and video in the media flow of the communication session and operated by the second user;
instructions that change media flow over the first bi-directional media path and the second bi-directional media path to send at least one of audio or video of the media flow of the communication session to the media device over the second bi-directional media path; and
instructions that obscure an existence of the media server and an existence of the media device from the second user during the communication session including during the exchanging of audio and video.

11. The computer-readable medium of claim 10, the instructions further comprising:
instructions that enable the first user and second user to exchange at least one of audio and video with one another via the second bi-directional media path and the third bi-directional media path; and
instructions that enable the first user to control the communication session with the control device, wherein control information is exchanged with the media server by the control device over the first bi-directional media path.

12. The computer-readable medium of 11, wherein the second bi-directional media path carries a first media type but not a second media type used during the communication session, the instructions further comprising:
instructions that provide the second media type to the control device via the first bi-directional media path.

13. The computer-readable medium of 10, the instructions further comprising:
instructions that provide at least one of early media, ringback, and comfort noise from the media server to the control device via the first bi-directional media path.

14. The computer-readable medium of 10, the instructions further comprising:
instructions that provide, during the communication session, one or more packets from the media server to the control device, the one or more packets including active speaker notification information.

15. The computer-readable medium of claim 10, wherein the first user corresponds to a called user and the second user corresponds to a calling user.

16. The computer-readable medium of claim 10, wherein the first user corresponds to a calling user and the second user corresponds to a called user.

17. An application server, comprising:
a processor; and
memory couple to the processor, the memory comprising a dynamic device pairing application in the form of processor-executable instructions, the dynamic device pairing application enables the processor to dynamically pair a control device comprising a first communication device for a first user and a media device comprising a second communication device for the first user during a communication session with a second user operating a third communication device, the control device, media device, and third communication device each exchanging audio and video in a media flow during the communication session, the control device controlling at least some of the functions of the communication session, the dynamic device pairing application enables the processor to cause the media server to separately establish a first bi-directional media path between the media server and the control device, a second bi-directional media path between the media server and the media device, and a third bi-directional media path between the media server and the third communication device, the dynamic device pairing application further enabling the processor to change media flow over the first bi-directional media path and the second bi-directional media path to send at least one of audio or video of the media flow of the communication session to the media device over the second bi-directional media path and hide an existence of the media server and the media device from the second user during the communication session including during the exchanging of audio and video.

18. The application server of claim 17, wherein the dynamic device pairing application enables the processor to solicit a first Session Description Protocol (SDP) Offer from the media server for the media device, receives the solicited first SDP Offer from the media server, provides the solicited first SDP Offer to the media device, receives a first SDP Answer from the media device, and provides the first SDP answer to the media server, wherein the solicited first SDP Offer and first SDP Answer enable the establishment of the second bi-directional media path.

19. The application server of claim 18, wherein the dynamic device pairing application further enables the processor to solicit a second SDP Offer from the media server for at least one of the control device and third communication device, receives the solicited second SDP Offer from the media server, provides the solicited second SDP Offer to the at least one of the control device and third communication device, receives a second SDP Answer from the at least one of the control device and third communication device, and provides the second SDP Answer to the media server, wherein the solicited second SDP Offer and second SDP Answer enable the establishment of at least one of the first and third bi-directional media path.

20. The application server of claim 17, wherein the dynamic device pairing application further enables the processor to instruct the media server to provide the control device with at least one of the following via the first media path: early media, ringback, comfort noise, and one or more packets including active speaker notification information.

* * * * *